Figure 1:
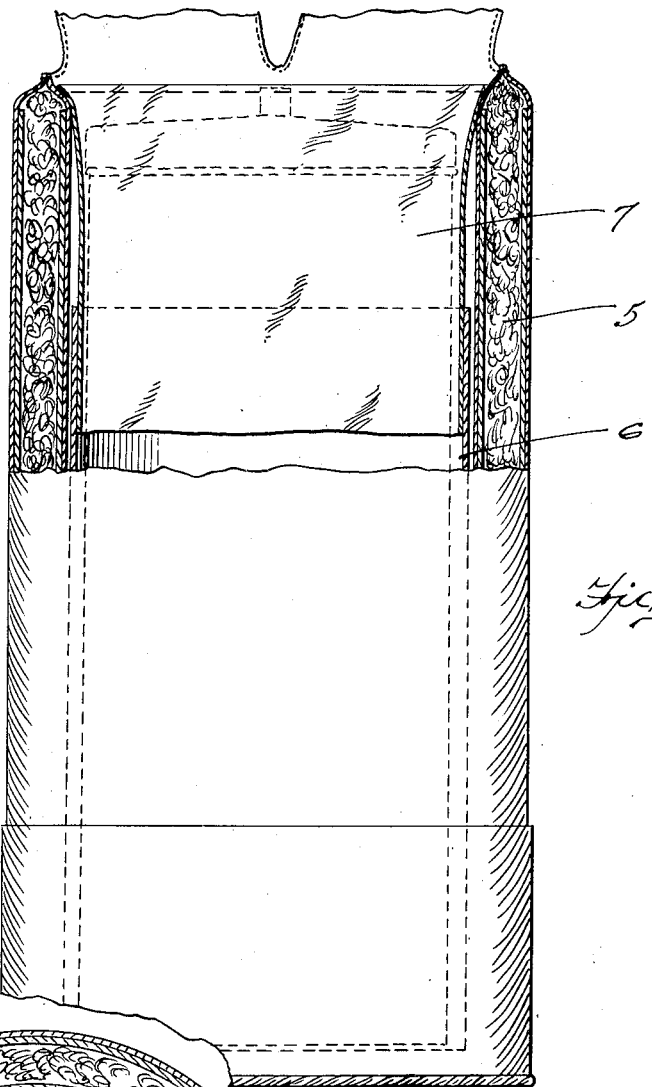

Sept. 27, 1927.

H. A. LIDENBERG 1,643,816

ICELESS ICE CREAM PACKER

Original Filed April 21, 1925

Inventor
H. A. Lidenberg

By

Attorney

Patented Sept. 27, 1927.

1,643,816

UNITED STATES PATENT OFFICE.

HENRY A. LIDENBERG, OF FERGUS FALLS, MINNESOTA.

ICELESS ICE-CREAM PACKER.

Application filed April 21, 1925, Serial No. 24,814. Renewed March 10, 1927.

The present invention relates to an iceless ice cream packer which is used for shipping ice cream in the usual cans, and returning the cans to the manufacturer.

The can of ice cream is inserted into the packer by the manufacturer. When the dealer receives the packer, the ice cream can is taken out thereof and packed in ice in the usual manner. After the ice cream dealer has used up the ice cream he places the can in the packer again, and returns it to the manufacturer. There is always a certain amount of ice cream left in the can, since the cans are seldom if ever washed by the dealers. This ice cream leaks from the can after it has melted, and while being in the express cars are often jostled about in such a manner as to be lying on their sides, so that the melted ice cream flows out into the inside of the packer and soils the same.

It is an important object of the invention to provide a metal lining in association with a water proof apron so that the ice cream which leaks from the cans may be caught on the apron, and said apron is located so that easy access may be had thereto in order that it may be washed by the manufacturer, thus preventing the entire packer from becoming soiled.

With the above and numerous other objects in view as will appear as the description proceeds, the invention resides in certain novel features of construction, and in the combination and arrangement of parts as will be hereinafter more fully described and claimed.

In the drawing:—

Figure 2:
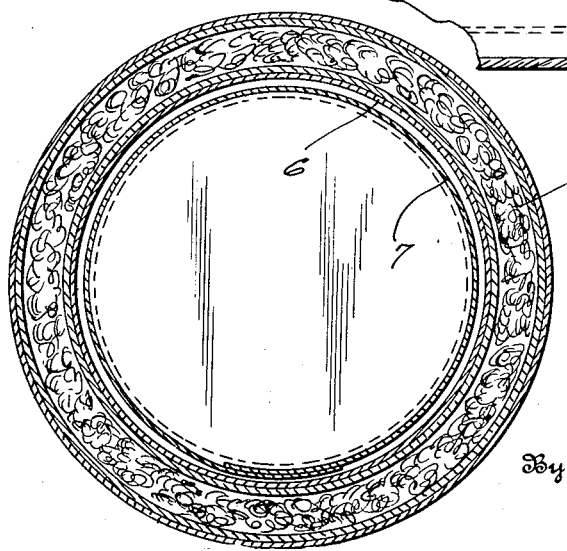

Figure 1 is an elevation of the packer embodying the features of my invention showing the upper portion thereof in vertical section, and Figure 2 is a transverse section through the packer.

Referring to the drawing in detail, it will be seen that the packer is in the form of a jacket having a padded side wall 5 constructed of canvas or like flexible water proof material. The closure of the jacket may be formed in any suitable manner such as is now the common practice. I place in the jacket a metallic lining 6, and an apron 7 is sewed to the upper portion of the interior of the jacket so as to extend down into the upper portion of the lining 6 as is clearly shown in Figure 1. The ice cream can itself is shown in dotted lines in Figure 1 and is inserted through the apron into the lining 6. It will thus be seen that any drippings from the ice cream can will be absorbed by the apron 7. After the ice cream can has been returned to the manufacturer, it is possible to easily wash the apron 7, and also to remove the metallic lining 6 and wash it.

It is thought that the construction, utility, and advantages of the invention will now be clearly understood without a more detailed description. It is apparent that the present embodiment of the invention has been disclosed merely by way of example, and that numerous changes in the details of construction, in the sizes, in the materials, and in the combination and arrangement of parts may be resorted to without departing from the spirit or scope of the invention as hereinafter claimed.

Having thus described the invention, what I claim as new and desire to secure by Letters Patent is:—

1. A device of the class described including, in combination, an insulating jacket, a metallic lining disposed in the jacket, and a fabric apron attached to the upper edge of the jacket and extending into the lining.

2. A device of the class described including, in combination, an insulating jacket having a continuous side wall and a bottom for forming a receptacle to receive a can, a metallic lining in the bottom portion of the jacket, and a fabric apron attached to the upper edge of the side wall and extending downwardly to terminate in the lining.

In testimony whereof I affix my signature.

HENRY A. LIDENBERG.